No. 881,677. PATENTED MAR. 10, 1908.
C. E. GOODENOUGH.
TRAP NEST.
APPLICATION FILED AUG. 2, 1907.

2 SHEETS—SHEET 1.

Witnesses

Inventor
Charles E. Goodenough
By Victor J. Evans
Attorney

No. 881,677. PATENTED MAR. 10, 1908.
C. E. GOODENOUGH.
TRAP NEST.
APPLICATION FILED AUG. 2, 1907.
2 SHEETS—SHEET 2.
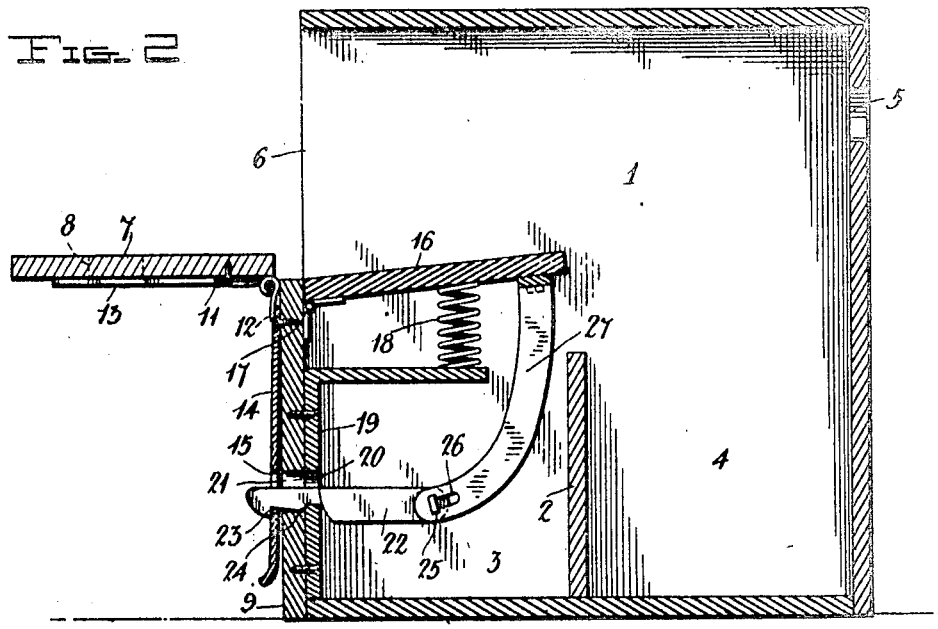
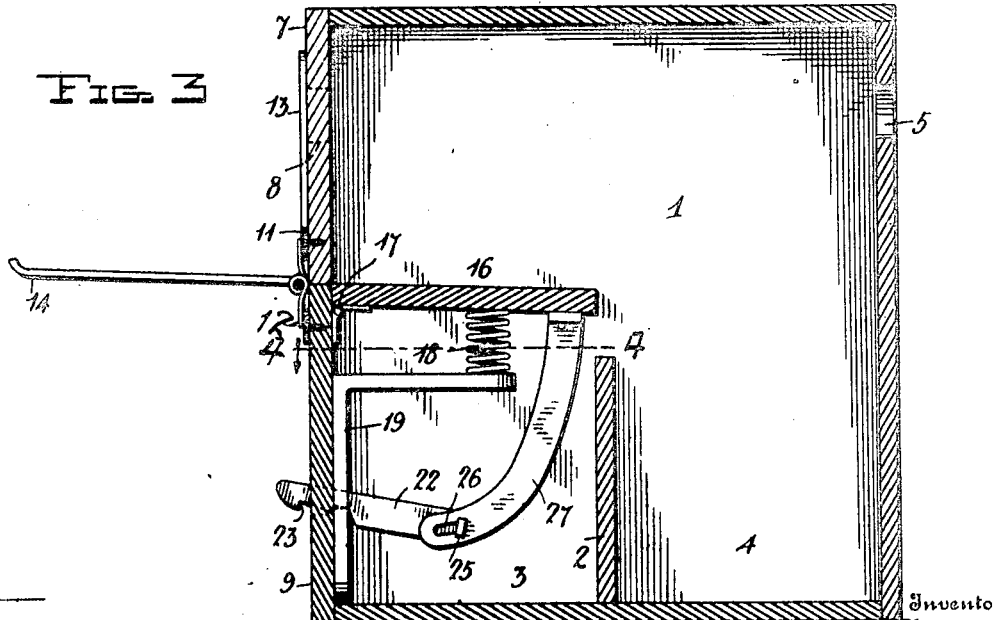
Inventor
Charles E. Goodenough
By Victor J. Evans
Attorney
Witnesses

UNITED STATES PATENT OFFICE.

CHARLES E. GOODENOUGH, OF PIERREPONT MANOR, NEW YORK.

TRAP-NEST.

No. 881,677.

Specification of Letters Patent.

Patented March 10, 1908.

Application filed August 2, 1907. Serial No. 386,778.

*To all whom it may concern:*

Be it known that I, CHARLES E. GOODENOUGH, a citizen of the United States, residing at Pierrepont Manor, in the county of Jefferson and State of New York, have invented new and useful Improvements in Trap-Nests, of which the following is a specification.

This invention relates to improvements in poultry trap nests designed for use in trapping hens within the nests so that a laying record may be conveniently kept, the object of the invention being to provide a simple, inexpensively constructed, reliable and efficient nest of this character wherein a novel and easily controlled construction of automatic means for entrapping the hen is employed, and wherein such means may be rendered inoperative to adapt the nest to be used as an ordinary nest if desired.

The invention consists of the features of construction, combination and arrangement of parts hereinafter fully described and claimed, reference being had to the accompanying drawings, in which:—

Figure 1:
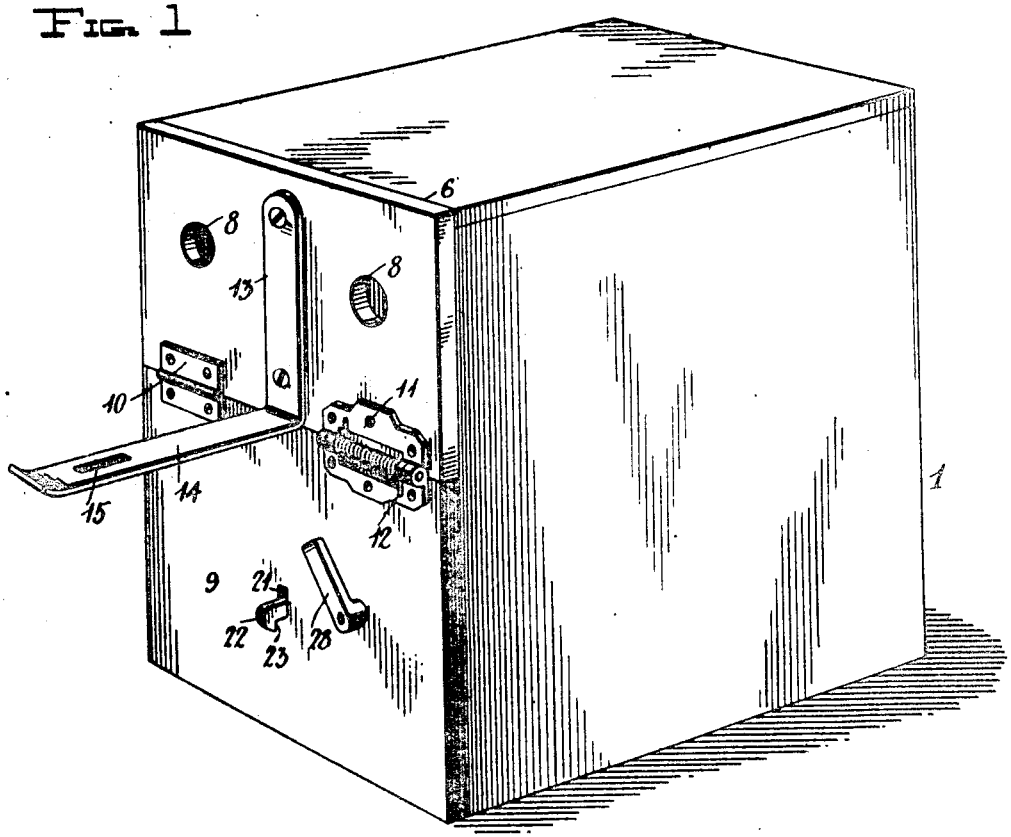
Figure 4:
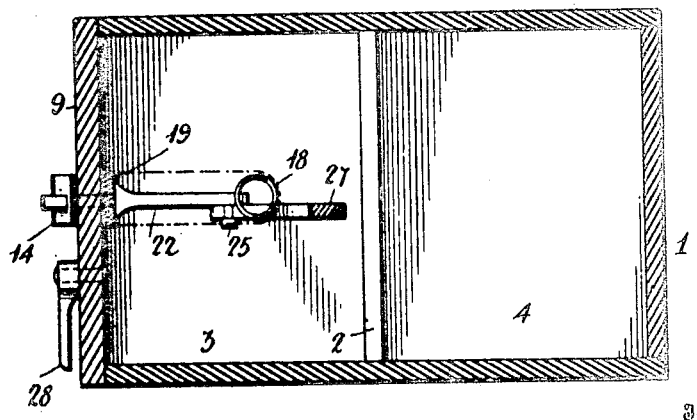

Figure 1 is a perspective view of a trap nest constructed in accordance with my invention. Fig. 2 is a central vertical front to rear section thereof, showing the trap set for use. Fig. 3 is a similar view showing the device as it appears when the parts are operated to entrap the hen. Fig. 4 is a sectional plan view on line 4—4 of Fig. 2.

Referring to the drawings, the numeral 1 designates a nest box formed of wood, metal or any other suitable material, or of a composite structure of several materials, as desired, and which is provided in its lower portion with a vertical transverse partition 2 forming compartments 3 and 4, the latter constituting the nest chamber of the box. The box is preferably of rectangular form, but may vary in form, size and construction to suit different contingencies of service, and, in the embodiment disclosed, is provided in its rear wall with ventilation openings 5 and at its upper front portion with a doorway 6 for the entrance and exit of the hen.

A hinged or pivoted swinging door 7 is provided for closing the doorway or entrance 6 and is designed to project horizontally outward in open position to form an entrance platform on which the hen may step on her passage to and from the nest. This door is preferably provided with openings 8 to afford proper ventilation when the box is closed thereby, and is hinged at its lower edge to the front wall 9 of the box by suitable hinges 10 and 11, one or both of which may be of the spring type and operate to automatically move the door to closed position. In the present instance, I have shown the hinge 11 as one type of spring hinge for the purpose described which may be used, but, of course, it will be understood that any preferred type of spring means for closing the door may be employed.

Carried by the door is an elbow bracket having one of its arms 13 secured to the outside of the door in a vertical position and its other arm 14 projecting at right angles thereto and formed with a slot 15 adapting it to serve the function of a latch hasp, which is adapted to lie against the outer surface of the front wall 9 when the door is in open position.

Arranged within the box above the compartment 3 is a tilting platform 16 hinged or pivoted at its forward edge to the upper portion of the wall 9, as indicated at 17, and adapted to be normally supported in a substantially horizontal position by a balancing spring 18 carried by the inwardly extending horizontal arm of an L-shaped bracket 19, whose vertical arm is secured in any suitable manner to the inner side of the wall 9 and is formed with a slot 20 adapted to register with a somewhat deeper slot 21 formed in the wall 9 and the slot 15 in the bracket 12 when the arm 14 thereof is disposed parallel with the wall 9, as shown in Fig. 2.

The platform 16 forms an approach leading from the doorway to a point above the front portion of the nest chamber 4 and is yieldingly supported by the spring 18 so that it may be depressed by the weight of a hen stepping thereon in entering the nest and passing to the chamber 4, which depression of the said platform is designed to effect the release of locking mechanism by which the door 7 is normally held open.

The locking mechanism comprises, in addition to the staple 14, a locking lever 22 arranged for pivotal or tilting motion in the slots 20 and 21, said lever having its body portion arranged in the compartment 3 and being provided with a reduced locking tongue or extension which projects through and is operative in the said slots and is provided with a pair of locking shoulders 23 and 24 to respectively interlock with the staple 14 and the bottom wall of the slot 20 in the bracket 19, whereby the lever and the staple will be simultaneously held in locked position to prevent accidental retraction of the lever itself and the casual release of the staple when the door 7 is open under any possible shocks or jars to which the box may be subjected. The lever is held from inward movement by the engagement of its shoulder 24 with the bracket 19 and is adapted to tilt in the slots for engagement with and disengagement from the locking member or staple 14 on the door. A headed pin or stud 25 is provided at the rear end of the body portion of the lever for engagement with the lower slotted end 26 of a curved operating arm 27 fixed to and depending from the rear portion of the platform 16 and movable in the space between the partition 2 and the horizontal arm of the bracket 19.

In the operation of setting the device for use as a trap nest, the arm 14 of bracket 12 operates as a lever by which the door may be swung to open position and the said arm moved downward to bring it into locking engagement with the shoulder 23 of the latch of locking lever 22, the outer end of which is shaped to form a curved nose adapting it to slide freely through the slot 15 and interlock automatically with the said arm when the latter is depressed. The door being thus held open, it will be understood that a hen desiring to enter the nest may step thereon and pass through the doorway onto the platform 16, which will be depressed under the weight of the hen and transfer downward motion through the arm 27, a limited downward motion of which is permitted by the slot 26 to allow the hen to pass to the rear of said platform before the door locking mechanism is released. When the platform is depressed to the maximum extent, the rear end wall of the slot 26 engages the stud 25 and tilts the lever to the position shown in Fig. 3, by which the shoulder 23 will be thrown out of locking engagement with the staple or locking member 14, whereupon the door 7 will be automatically closed by the action of its closing spring, thus entrapping the hen. As soon as the hen jumps from the platform 16 into the nest chamber 4, the platform will be restored to normal position with the locking mechanism associated therewith by the action of the spring 18, and from the foregoing description the mode of resetting the trap for further use will be understood.

A pivoted turn button or latch 28 is provided upon the front wall 9 for engagement with the staple or latch member 14 to hold the door from closing against the action of its closing spring when it is desired to maintain the parts in position shown in Fig. 2 to adapt the box for use as an ordinary nest.

From the foregoing description, taken in connection with the accompanying drawings, the construction and mode of operation of the improved trap nest will be readily understood, and it will be seen that the invention provides a device of this nature which may be manufactured at a comparatively low cost, which comprises comparatively few parts and hence is not liable to get out of order, and which is effective for its intended purpose.

Having thus fully described the invention, what is claimed as new is:—

1. A trap nest comprising a casing having a doorway, a pivoted automatically closing door adapted to close the doorway and to swing outwardly to a horizontal position to form a platform, a yieldingly supported platform extending inwardly from the doorway, a locking member on the door projecting downwardly when the door is in open position, a coacting catch upon the box projecting through the front thereof to engage said locking member, and a connection between the platform and catch for retracting the latter when the platform is depressed.

2. A trap nest comprising a casing having a doorway, a spring closed door for closing said doorway, said door being adapted to swing outward to a horizontal position to form a platform and having a locking member thereon adapted when the door is open to extend downwardly, a hooked latch pivotally mounted upon the casing and projecting through the front thereof to engage said locking member, a yieldingly supported platform extending inwardly from the doorway, and a connection between said platform and the latch whereby the latter is adapted to be retracted when said platform is depressed.

3. A trap nest comprising a casing having a doorway in the upper front portion thereof, an automatically closing door adapted to swing outward to a horizontal position, a locking member upon the door, a pivoted latch upon the casing adapted to engage said locking member, a yieldingly supported platform extending inwardly from the doorway, and a connection between said platform and the latch for retracting the latter when said platform is depressed.

4. A trap nest comprising a casing having a doorway, a door for closing the doorway, a movable platform upon the interior of the casing, latch mechanism for holding the door open, means operated by the platform for releasing said latch mechanism, and means for rendering the latch mechanism inoperative.

5. A trap nest comprising a casing having a doorway, a pivoted door for closing the doorway, a pivoted spring supported platform within the casing, a latch member mounted tiltingly upon the casing, a hasp upon the door adapted to interlock with said latch member, and means operated by the platform for tilting said latch member.

6. A trap nest comprising a casing having a doorway, a pivoted door for closing the doorway, a hasp upon the door, a movable platform within the casing, a tilting latch bolt upon the casing to engage the hasp, and a connection between said bolt and the platform.

7. A trap nest comprising a casing having a doorway, a pivoted door for closing the doorway, an arm forming a hasp fixed to the door, a spring supported platform within the casing, a tilting latch member mounted upon the casing and adapted to engage the hasp, and a connection between the platform and latch member, said connection having a sliding pivotal engagement with the latch member, substantially as described.

In testimony whereof, I affix my signature in presence of two witnesses.

CHARLES E. GOODENOUGH.

Witnesses:
   ADELAIDE E. GRENELL,
   MILA P. BROWN.